United States Patent [19]

Rivers, Jr.

[11] Patent Number: 4,623,489

[45] Date of Patent: Nov. 18, 1986

[54] METHOD OF REFINING EDIBLE OIL FOR PREVENTING AUTO-OXIDATION OF THE OIL

[76] Inventor: Jacob B. Rivers, Jr., 2801 NW. Expressway, Suite 125, Oklahoma City, Okla. 73120

[21] Appl. No.: 719,220

[22] Filed: Apr. 2, 1985

[51] Int. Cl.[4] ............................ C09F 5/10; C11B 3/04

[52] U.S. Cl. .................................... 260/424; 260/420; 260/428; 426/478

[58] Field of Search ....................... 260/424, 420, 428; 426/478

[56] References Cited

U.S. PATENT DOCUMENTS

| | | | |
|---|---|---|---|
| 3,857,866 | 12/1974 | Gibble et al. | 260/428 |
| 4,089,880 | 5/1978 | Sullivan | 260/424 |

OTHER PUBLICATIONS

Anderson, A. J. C., *Refining of Oils & Fats,* The MacMillan Co., N.Y., 1962, pp. 95-96.

*Primary Examiner*—Charles F. Warren
*Assistant Examiner*—Elizabeth A. Flaherty
*Attorney, Agent, or Firm*—Laney, Dougherty, Hessin & Beavers

[57] ABSTRACT

A method of refining edible oil which protects the oil from auto-oxidation and hydrolysis. The method of refining is of the type which includes a degumming stage where acid-water are blended with the oil to capture phosphatides in the oil and then separated from the oil to carry away the phosphatides. The method comprises deaerating the acid-water prior to blending with the oil so that as the acid-water removes phosphatides it also removes oxygen from the oil. Subsequent to the degumming stage, it is preferable that the processed oil be protected against any further contact with oxygen or water. If it is desired to remove all traces of oxygen an oxygen scavenger such as sodium sulfite can be added to the acid-water used in degumming.

12 Claims, 1 Drawing Figure

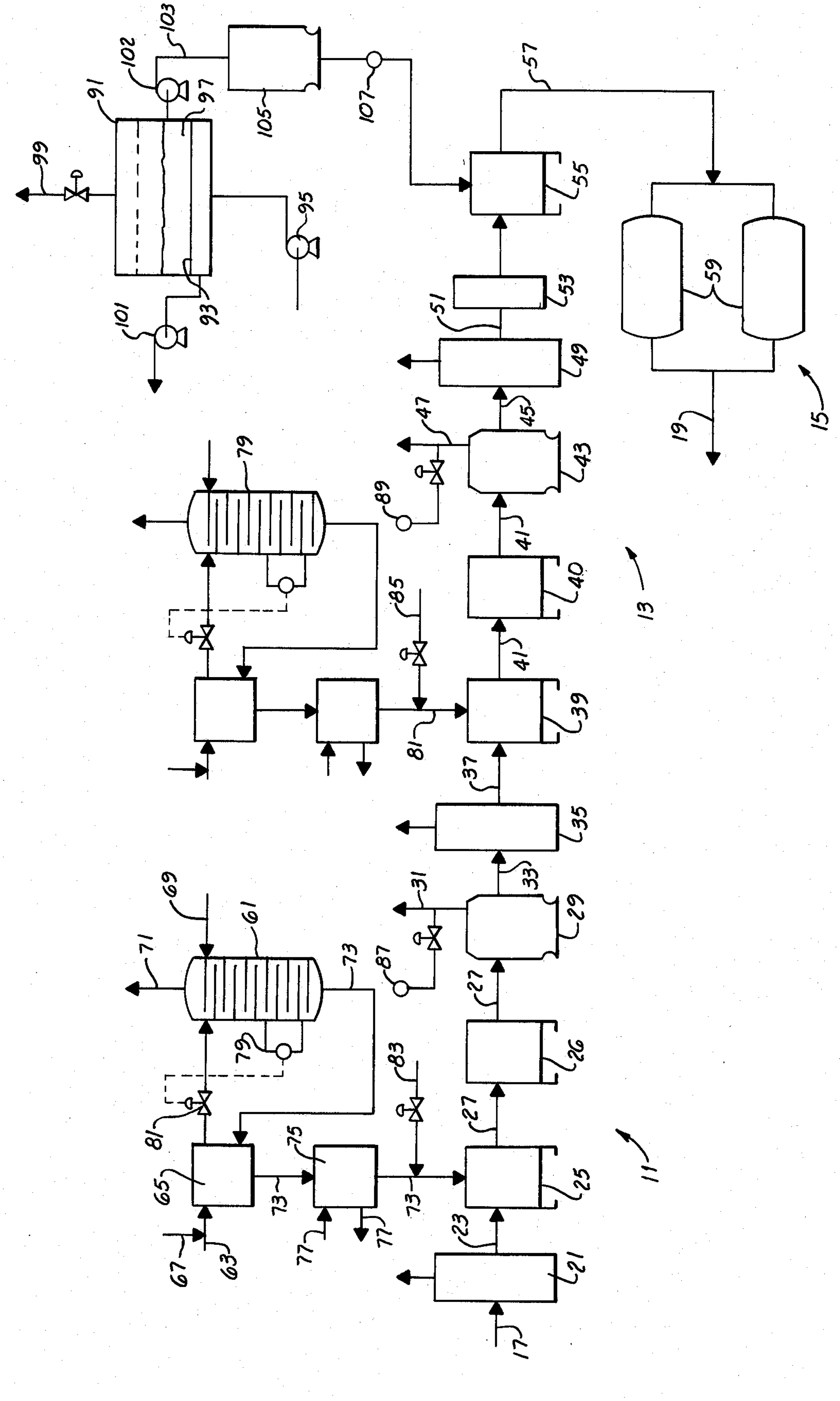
11
13
15
17
19
21
23
25
26
27
29
31
33
35
37
39
40
41
43
45
47
49
51
53
55
57
59
61
63
65
67
69
71
73
75
77
79
81
83
85
87
89
91
93
95
97
99
101
102
103
105
107

METHOD OF REFINING EDIBLE OIL FOR PREVENTING AUTO-OXIDATION OF THE OIL

BACKGROUND OF THE INVENTION

1. Field of the Invention

This invention relates in general to methods of refining and deodorizing edible oils and fats and, more particularly, to methods of refining to prevent auto-oxidation of edible oils and fats.

2. Description of the Prior Art

In the past, refining of edible oils has generally been a batch or semi-continuous processes. Thus, bleaching, degumming, deaerating, vacuum distillation, caustic refining and other steps have been performed in either separate steps or in steps which hold large volumes of oil for relatively long periods. During such processes it is necessary to protect the oil from auto-oxidation. Auto-oxidation is the formation of peroxide bonds and hydroperoxide bonds in the fatty acid chain as a result of oxygen dissolved in the oil, oxygen in the air contacting the oil, and hydrolysis of water in oil. If auto-oxidation occurs, the oil becomes unstable and rancid.

The present methods of protecting the oil from auto-oxidation include deaeration and the addition of anti-oxidants. Deaeration, when it has been used, has been achieved by subjecting the oil to a vacuum in a holding vessel. It is necessary to hold the oil in a vessel for several minutes in order to achieve the deaeration. Deaeration processes are shown in U.S. Pat. No. 2,691,665 to Bailey and in U.S. Pat. No. 4,089,880 to Sullivan. The Bailey patent shows an oil deaeration in the deodorization stage and the Sullivan patent shows an oil deaeration in the bleaching stage.

In conjunction with deaeration, common method of protecting the oil against auto oxidation is to add anti-oxidants to the oil. Such anti-oxidants include BHA, BHT, THBP and TBHQ. A particular problem with adding anti-oxidants is that such anti-oxidants are relatively expensive and are of unknown toxicity.

Protecting the oil against auto-oxidation becomes especially important as the natural anti-oxidants in the oil such as phosphatides and tocopherol are removed from the oil. Generally, phosphatides are removed from the oil by a degumming step and tocopherol is removed from the oil during caustic refining or vacuum steam refining. Deaeration of the oil as used in the past generally occurs during steam refining or deodorization. Of course, the longer the oil remains unprotected after natural anti-oxidants are removed, the more auto-oxidation will occur. The addition of anti-oxidants as used in the past generally occurs after the oil is completely refined and prior to shipping in order to protect the oil from becoming rancid.

The methods of protecting the oil against auto-oxidation of the past have not been entirely satisfactory. Particularly, they have been less efficient, more expensive and less effective than is desirable.

The present invention provides an improved method of refining with prevents auto-oxidation of oil associated with refining and deodorization and thereafter. This method is especially useful with the method of continuous refining and deodorization disclosed in my co-pending patent application Ser. No. 540,037 filed Oct. 7, 1983. In order to provide a more complete understanding of the present invention and the art of edible oil refining in general, reference may be had to this co-pending application, the disclosure of which is incorporated herein by reference.

SUMMARY OF THE INVENTION

In view of the problems of auto-oxidation encountered in the past, it is an object of the present invention to provide an improved method for refining and deodorization of edible oil which more efficiently and effectively protects the oil from auto-oxidation. It is also an object of the present invention to provide such protection without adding additional oil processing steps and either without the addition of anti-oxidants, or with the addition of lower quantities of anti-oxidants.

It is a further object of the present invention to improve the continuous refining and deodorization processes of the type which include air-isolation and continuous steps of degumming by acid-water washing of the oil and/or bleaching of the oil by absorption on clays and subsequent filtration.

In accordance with these objects, the present invention provides an improved method of continuous refining and deodorization of edible oil of the type including air-isolation and continuous steps of degumming by acid-water washing of the oil. The improvement comprises deaerating the oil during the step of degumming by deaerating the acid-water mixture used in the process of degumming to less than one thousand parts per billion of dissolved oxygen so that, as the acid-water mixture removes phosphatides, it also removes oxygen from the oil due to oxygen in the oil being dissolved into the deaerated acid-water mixture and removed therewith. Thus, without adding any additional oil processing steps the oil is deaerated during degumming. This is especially desirable since the phosphatides removed during degumming are natural anti-oxidants. Thus, the present invention protects the oil by deaeration in the very process which removes the natural oil anti-oxidants.

In order to provide a better deaeration of oil it is preferable to deaerate the acid-water used in degumming to less than one hundred parts per billion of dissolved oxygen. Most preferably, the deaeration results in an acid-water mixture of less than fifty parts per billion of dissolved oxygen.

Following deaerating by degumming with a deaerated acid-water mixture, the present invention preferably includes a step of bleaching which protects the oil against oxidation which would otherwise occur in contacting the oil with clay having oxygen retained thereon. Protection of the deaerated oil is provided by purging oxygen from the bleaching clay with nitrogen and/or oxygen-scavenging gases prior to using the clay in the bleaching process. Other liquids and solids added subsequent to degumming should also be deaerated.

Although the present invention functions well to inhibit auto-oxidation without adding any special material to the oil, the addition of an oxygen scavenger, such as sodium sulfite eliminates any traces of oxygen. This oxygen scavenger should be added to the water used in degumming. The volume of sodium sulfite added can be gauged by the amount of sodium sulfite remaining in the water after the water is removed by the centrifuge used in degumming. Thus, no oxygen scavenger remains in the oil.

For a further understanding of the invention and for further objects, features and advantages, reference may now be had to the following description of preferred embodiments taken in conjunction with the accompanying drawings.

BRIEF DESCRIPTION OF DRAWING

The Drawing is a schematic view of a portion of an oil refining process including the steps of the present invention.

DESCRIPTION OF PREFERRED EMBODIMENTS

The present invention provides protection of oil against auto-oxidation during the process of refining and deodorizing the oil. Particularly, the present invention alters conventional steps of degumming and bleaching so as to deaerate the oil and to protect the oil against auto-oxidation. In order to be effective, the present invention must be used in a process of refining and deodorizing of the type which isolates the treated oil from oxygen. In other words, if the oil contains dissolved oxygen or contacts oxygen in the air subsequent to the degumming and bleaching steps of the present invention then the advantage of the invention is lost. A continuous process of refining and deodorizing edible oil which provides air-isolated steps is described in my co-pending patent application Ser. No. 540,037.

Referring to the drawing, a portion of a continuous process for refining and deodorizing edible oil such as soybean oil is shown. It includes two degumming stations 11 and 13 and a bleaching station 15. Raw oil enters the process in a stream 17 and exits in a stream 19 after passing through the degumming and bleaching stations.

Other stations, processes and equipment are, of course, necessary for complete processing of the oil. However, the illustrated steps are those that are pertinent to show the improved method of this invention. The equipment and steps not shown are either conventional or are shown in my co-pending application Ser. No. 540,037. The oil which enters the system is a raw oil such as soybean oil and includes phosphatides, carotenes, chlorophyll and other coloring agents, dissolved oxygen, water, and various oil components of differing boiling points.

The entering stream of oil 17 is first slightly heated in a heat exchanger 21 and low pressure is applied to the oil to remove some air and water. Leaving the heat exchanger 21 is an oil stream 23. The temperature of stream 23 is generally less than 100° F. in order to promote removal of dissolved oxygen as described below. The oil enters the degumming station 11 with dissolved oxygen therein even though some air and water have been removed in the heat exchanger 21.

Stream 23 enters a blender 25 and then a high speed mixer 26 where the raw oil is mixed with acid-water and blended so that the phosphatides in the oil are dissolved in the acid-water and removed from the oil. The blended oil-water leaves the high speed mixer 26 in a stream 27 and enters a centrifuge 29. The centrifuge 29 separates the blended oil-water mixture into a water stream 31 and a oil stream 33. Following this first degumming step, the oil stream 33 enters an air and water vacuum distillation chamber 35.

After removal of air and water in the distillation chamber 35, a stream of oil 37 exits the chamber 35 and enters a second blender 39. A second acid-water-oil blending occurs in a blender 39 and a mixer 40 and the blended acid-water and oil exit the mixer 40 in a stream 41 and enters a second centrifuge 43. The centrifuge 43 separates the mixture into an oil stream 45 and an acid-water stream 47 which carries away additional phosphatides from the oil. Thus, a second stage of degumming is provided.

Following the second stage of degumming, the oil stream 45 enters a second vacuum distillation chamber 49 for additional removal of water, if any remains. Oil leaves the distillation column 49 in a stream 51 which enters a heat exchanger 53 and is heated to approximately 230° F. Following heating, the oil enters a mixer 55 which mixes clay with the oil for bleaching. The oil-clay mixture leaves the mixer 55 in a stream 57 and enters a set of clay presses 59 which remove the clay from the oil and thereby remove carotenes, chlorophyll and color chemicals from the oil. Stream 19 leaves the clay presses and, if desired, the remaining steps of refining are provided for an enclosed and continuous refining.

The above-described equipment has already been described in my co-pending patent application Ser. No. 540,037. The general concepts of degumming and bleaching are conventional. The continuous processes and the manner of vacuum distillation described in the co-pending patent application when used in combination with the conventional concepts are particularly suited for use with the present invention because they show an air-isolated, continuous refining process which protects the oil from air and water after the oil begins to be processed.

The present invention improves conventional degumming and bleaching processes by deaeration of the acid-water mixture used in degumming and by deaerating the clay used in bleaching. This deaeration can be achieved with relatively inexpensive equipment and without any additional oil processing steps. All that is necessary is to add a few pieces of equipment to the degumming and bleaching devices.

The present invention improves the degumming process by deaerating the acid-water mixture prior to blending the acid-water mixture with the oil. As shown in the drawing, this can be achieved in a conventional tray-type deaerator 61. Surface water enters the tray-type deaerator 61 through a stream 63 which is first heated in a heat exchanger 65. Acid is introduced to the water stream 63 by a stream 67 prior to the heat exchanger 65. The acid utilized is generally phosphoric acid, malic acid or acetic acid and the acid-water mixture generally has a pH of approximately 4. Plant steam is added to the deaerator 61 through a stream 69 in sufficient quantities to hold the deaeration chamber temperature at approximately 225° F. Air and steam gases exit the deaeration chamber 61 through a vent stream 71.

The acid-water mixture exits the bottom of the deaerator 61 in a stream 73 and exchanges heat with the incoming stream 63. It is further cooled in a cooling heat exchanger 75. A cooling water stream 77 is supplied to the heat exchanger 75 in order to accomplish this heat exchange.

The deaerator 61 is provided with a level control 79 which maintains a liquid seal on the deaerator by controlling the flow of the acid-water stream 63 through a valve 81. By means of the deaerator 61, the acid-water mixture in stream 73 has its dissolved oxygen content reduced to less than fifty parts per billion.

An acid-water mixture which has a surface water source saturated with dissolved oxygen generally contains from seven to eight thousand parts per billion of dissolved oxygen. In order to deaerate the oil during process of degumming, it is necessary to deaerate the acid-water to less than one thousand parts per billion of dissolved oxygen. Much more preferably, the acid-water mixture should contain less than one hundred parts per billion of dissolved oxygen and most preferably less than fifty parts per billion of dissolved oxygen. These ranges of dissolved oxygen can be obtained by the equipment described.

Many degumming processes utilize a second or third acid-water wash. The present invention depicted in the drawings illustrate the process having two degumming stations 11 and 13. As with the first degumming station 11, the degumming station 13 also includes a deaerator 79 and related equipment to perform substantially the same type of deaeration for the acid-water used in the second stage of degumming. Thus, the acid-water added to mixer 39 through stream 81 is deaerated to less than one thousand parts per billion of dissolved oxygen. Preferably, the dissolved oxygen is less than fifty parts per billion so that the oil which is passed through the first degumming station 11 and has been substantially deaerated because of the mixture with the deaerated acid-water will be further deaerated. Of course, further deaeration requires that the acid-water in stream 81 have a lower content of dissolved oxygen than the oil in stream 37.

Generally, the acid-water introduced in the first and second degumming stations 11 and 13 is added at a rate of approximately four percent (4%) of the mass of the oil. This is sufficient to provide adequate deaeration of the oil provided the water is deaerated to the ranges specified.

If it is desired to remove absolutely all of the dissolved oxygen from the oil, an oxygen scavenger such as sodium sulfite can be added. Streams 83 and 85 are shown for adding to streams 73 and 81, respectively and an appropriate amount of sodium sulfite. The amount of sodium sulfite to be added can be determined by measuring how much sodium sulfite remains in the water separated in streams 31 and 47. Sodium sulfite sampling devices 87 and 89 are provided for measuring the sodium sulfite content of samples removed from streams 31 and 47.

Following the deaeration which occurs in the degumming stations 11 and 13, it is critical to not add oxygen back to the oil by means of liquids, gases or solids which are co-mingled with the oil. Thus, it is important to deaerate the clay utilized in the bleaching process.

Clay to be deaerated is introduced to a deaeration chamber 91 and supported on a clay support membrane 93. The clay support membrane is sufficiently porous to allow gas to pass therethrough as it is pumped into the space beneath the membrane 93. A pump 95 is provided for pumping gas into the space beneath membrane 93 and through the clay 97 supported thereon. By pumping nitrogen gas through the clay 97, oxygen is purged from the clay. Gas exits the chamber through a restricted port 99. Following the nitrogen gas percolation through the clay 97, vacuum can be applied to the clay by means of a vacuum pump 101 connected to the space beneath the membrane 93. Of course, the restricted port 99 is closed during this operation. This alternating nitrogen gas percolation and vacuum degassing can be repeated until a required amount of oxygen is removed from the clay. Kaolin clay is a typical clay used in bleaching processes and this method of degassing is appropriate to remove almost all of the oxygen from such clay.

In order to remove the final traces of oxygen in the clay, fluorine gas can be percolated through the clay in the fluidized bed followed by vacuum degassing. Acetylene gas and carbon monoxide gas are suitable alteratives to fluorine gas for the final removal of oxygen from the clay. Further, traditional methods for recovering fluorine, acetylene, and carbon monoxide can be utilized to recycle these gases. Following the deaeration of the clay 97, the clay is pumped by a pump 102 in a stream 103 to a hopper 105 where it is available for being introduced to the mixer 55. A star feeder 107 is provided for conveying the appropriately metered amounts of clay from the hopper 105 into the mixer 55 while still remaining sealed against atmospheric oxygen.

After the oil is deaerated in the degumming process, it is important to protect the oil against auto-oxidation in all of the processing of the oil, not just the additional step of bleaching. Thus, it is desirable to completely enclose the continuous process and provide nitrogen shielding where appropriate. Further, appropriate sealing of pumps and the like is required. Such air-isolation can be achieved using conventional equipment and the equipment described in my co-pending patent application Ser. No. 540,037.

If other liquids are added to the oil in processing downstream of degumming, these liquids must be deaerated in the same manner as the acid-water mixture in the degumming process. Similarly, any other solids which are introduced to the process must be purged of oxygen in the same manner as the clay in the bleaching process. As long as the dry materials are finely divided, they can be purged of oxygen in a fluidized bed as described above.

When a refining process includes hydrogenation by means of contacting catalysts such as nickel salts with the oil, the present invention provides an advantage in addition to the advantage of preventing auto-oxidation of the oil. This advantage is that the poisoning of the catalyst by oxygen is reduced. Because the poisoning of catalysts requires replacement which is expensive, the advantage of reducing the poison of the catalyst is significant. The method of purging oxygen from the catalyst can be the same as shown for the clay deaeration.

By means of the deaeration and dehydration provided by the present invention, a much improved refining process is achieved. In fact, it is expected that all steam stripping can be made unnecessary.

The deaeration provided in the degumming process and the immediate removal of all water and dissolved oxygen prevent hydrolysis and auto-oxidation of the oil. The continuous refining described in my co-pending application also continues to remove molecular oxygen after bleaching and degumming and eliminates the addition of either water (in steam stripping) or oxygen (in any other solids or liquids or by opening the oil to the atmosphere). Although the complete refining process as shown in my copending application shows a final stage of steam stripping, the use of the present invention together with the driven-sheet method of distillation eliminates the necessity of steam stripping and provides a much improved product. This improvement results from the oil not being subjected to oxidation or hydrolysis at any stage, one of the most severe of which is steam stripping as performed in the prior art.

Thus, the methods of the present invention are well adapted to obtain the objects and advantages mentioned as well as those inherent therein. While presently preferred embodiments of the invention have been described for the purpose of this disclosure, numerous changes in the construction of equipment to achieve the method and in the steps of the method can be made by those skilled in the art, which changes are encompassed in the spirit of this invention as defined by the appended claims.

The foregoing disclosure and the showings made in the drawings are merely illustrative of the principals of this invention and are not to be interpreted in a limiting sense.

What is claimed is:

1. An improved method for refining and deodorization of edible oil of the type including air-isolated and continuous steps of degumming by acid-water washing of the oil; the improvement comprising the step of:

deaerating the oil during the step of degumming by deaerating the acid-water mixture used in the process of degumming to less than one thousand parts per billion of dissolved oxygen so that as the acid-water mixture removes phosphatides it also removes oxygen from the oil due to oxygen in the oil being dissolved in the deaerated acid-water mixture and removed therewith.

2. The improved method of claim 1 wherein said step of deaerating the oil comprises deaerating the acid-water mixture to less than one hundred parts per billion of dissolved oxygen.

3. The improved method of claim 2 wherein said step of deaerating the oil comprises deaerating the oil to less than fifty parts per billion of dissolved oxygen.

4. An improved method for continuous refining and deodorization of edible oil of the type including air-isolated and continuous steps of degumming by acid-water washing of the oil and bleaching by clay filtration of the oil followed by removal of fatty acids by vacuum distillation; the improvement comprising the steps of:

deaerating the oil during the step of degumming by deaerating the acid-water mixture used in the process of degumming to less than one thousand parts per billion of dissolved oxygen so that as the acid-water mixture removes phosphatides it also removes oxygen from the oil due to oxygen in the oil being dissolved in the deaerated acid-water mixture and removed therewith; and protecting the deaerated oil from said deaerating step during the step of bleaching by deaerating the clay used in the bleaching step.

5. The improved method of claim 4 wherein said protecting step comprises:

nitrogen gas purging of oxygen from the clay followed by fluorene gas purging of oxygen from the clay.

6. The improved method of claim 4 wherein said vacuum distillation is isolated and scaled so that the oil being subjected to vacuum distillation does not contact water or oxygen thereby preventing oxidation and hydrolysis of the oil.

7. The improved method of claim 6 wherein said step of deaerating the oil comprises deaerating the acid-water mixture to less than one hundred parts per billion of dissolved oxygen.

8. The improved method of claim 7 wherein said step of deaerating the oil comprises deaerating the acid-water mixture to less than fifty parts per billion of dissolved oxygen.

9. The improved method of claim 4 which further comprises adding an oxygen scavenger to the water used during the step of degumming.

10. The improved method of claim 9 wherein the oxygen scavenger comprises sodium sulfite.

11. The improved method of claim 1 which further comprises adding an oxygen scavenger to the water used during the step of degumming.

12. The improved method of claim 11 wherein the oxygen scavenger comprises sodium sulfite.

* * * * *